UNITED STATES PATENT OFFICE.

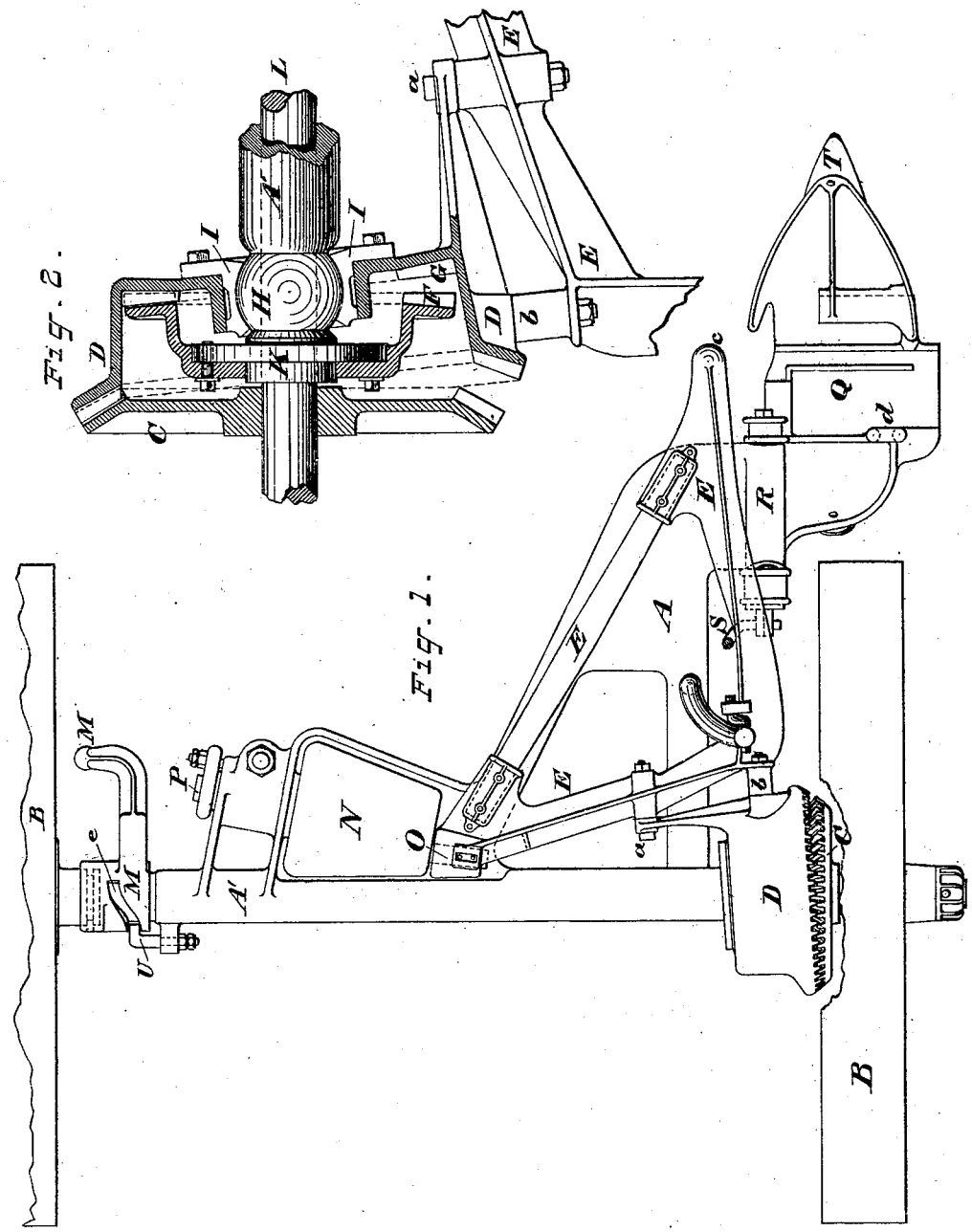

RUFUS DUTTON, OF YONKERS, NEW YORK, ASSIGNOR TO WILLIAM N. WHITELEY, OF SPRINGFIELD, OHIO.

HARVESTER.

SPECIFICATION forming part of Letters Patent No. 243,531, dated June 28, 1881.

Application filed July 17, 1880. (No model.)

*To all whom it may concern:*

Be it known that I, RUFUS DUTTON, of the city of Yonkers, county of Westchester, and State of New York, have invented a new and useful Improvement in Harvesting-Machines; and I do hereby declare that the following is a full, clear, and exact description thereof, reference being had to the accompanying drawings, making a part of this specification.

My invention relates to a new method of applying differential gearing to the driving mechanism of the knives or cutters of harvesting-machines.

Differential gears, one of which oscillates on a gimbal-joint, and by which motion is given to a vibrating arm, which, in turn, gives motion to the knives, have heretofore been used on harvesting-machines. The objection to the use of the gimbal-joint for this purpose is, that it is not such a universal joint as will give uniform motion. It is complicated and expensive, and the joints are very liable to wear in use, and thus cause the lower end of the vibrating arm to drop down and come in contact with the frame.

The object of my invention is to provide a means whereby differential gears may be used without the gimbal-joint, so as to secure uniform motion and simplify and make more durable the mechanism for driving the knife; and it consists in a revolving gear and an oscillating ring with two rows of gear-teeth, one row whereof is in differential mesh with said revolving gear, and meshing with the other row of gear-teeth above mentioned an inclosed stationary gear, to prevent the revolution of oscillating gear, and in connection with the above devices a vibrating arm rigidly attached to the oscillating gear, and a crank and fly-wheel; and in a sleeve-frame provided at one end with a spherical bearing for the oscillating joint, and a stationary gear to mesh with the oscillating gear and prevent rotation of the same.

When a gimbal-joint is used the gear that is connected with it, while free to oscillate, is prevented by the joint itself from rotating; but when a ball-and-socket joint is used the gear connected with it is free both to oscillate and rotate, and it is therefore necessary to provide some means independent of the joint which will prevent such gear rotating while it is free to oscillate.

My invention, for this purpose, consists in combining with or applying to the oscillating gear, to which is rigidly fastened the vibrating arm which drives the knife, a device, as hereinafter described and claimed, which will prevent such gear rotating, but will permit its free oscillation, and consequently the free reciprocation of the arm fastened to it. This device, it is evident, must be upon the frame or some non-rotating part of the machine, and becomes in reality a fulcrum about which the leverage of the oscillating gear acts.

Of the drawings, Figure 1 is a plan of a machine embodying my invention. Fig. 2 is an enlarged transverse section through the differential gears, showing the device by which the oscillating gear is prevented from having rotary motion.

Similar letters of reference indicate like parts.

A represents the main frame, A' being that part of the main frame called the "sleeve," through which the axle passes; B, the driving and carrying wheels; C, that one of the differential gears which is fastened to and rotates with the main axle L.

D is the differential gear which oscillates and which gives motion to the driving-arm E. This gear D oscillates upon the ball H, said ball in this instance being a part of the main frame A'.

I is a socket, made in halves to fit the ball H, and rigidly secured to the oscillating gear D, so as to permit said gear D to oscillate about the ball H as a center.

E is a triangular driving-arm rigidly secured to the oscillating gear D at the points $a$ and $b$. One corner of said arm embraces the crank-pin O, while the connecting-rod for driving the knife is attached at the end $c$.

K is a flange formed upon and being a part of A' of the main frame. To this flange is rigidly bolted a stationary or non-rotating gear, F.

The oscillating gear D is also provided with a second set of gear-teeth, G, which are equal in pitch and number with the teeth on the gear F, into which they mesh.

N is a fly-wheel mounted on the shaft P.

M is a shifting-lever for disengaging the gear, and U an adjustable hook attached to the frame A, the hook end of which part U engages in the spiral slot $e$ in the lever M and disengages or engages the gear as the lever M is turned.

Q is the inside shoe, attached to the frame A by the hinge R.

S is the lower end of a link for tilting the finger-bar.

$d$ is an eye on the shoe, into which is hooked a link for lifting the finger-bar.

T is the false shoe.

The operation of my device or improvement is as follows: When power is applied to the main axle L through the driving-wheels B the gear C is caused to rotate. This, in turn, causes the gear D to oscillate with its driving-arm E about the ball H as a center, the crank O causing all the teeth in D to come successively in contact with those in C. If, however, there was not a stop or support to the gear D, it would not oscillate upon the ball H, but would rotate with the gear C. Such a stop is provided by the non-rotating gear F and the second set of gear-teeth G on the oscillating gear D. The teeth G on the oscillating gear D being equal in pitch and number with those on the stationary gear F, rotary motion of the vibrating gear as the differential gears C D come successively in contact through the action of crank O is prevented. When the gears C and D are in contact and the gear C turns the pressure from C upon D tends to tip the gear D about one of the teeth of F as a fulcrum, while the continuous rotation of C brings each of the teeth in C and F successively in contact with the teeth in D and G, thus causing D to oscillate about the ball H as a center, the crank O and fly-wheel N equalizing the motions. The oscillations of D and rotations of O give a reciprocating motion to the end $c$ of the arm E. The proportions of the differential gears C and D must be such as to give the necessary number of reciprocations to the arm E for one revolution of the driving-wheels B.

What I claim, and desire to secure by Letters Patent, is—

1. In combination with the differential gears C and D and driving-arm E, fixed to said gear D, the stationary gear F and corresponding gear G upon the oscillating gear D, for the purposes set forth.

2. The differential gears C and D, the gears F and G, the arm E, the crank O, and fly-wheel N, combined to operate substantially as and for the purposes specified.

3. The sleeve $a'$, provided with the flange K, teeth F, and ball H, constructed and arranged substantially as described, and adapted to operate as set forth.

RUFUS DUTTON.

Witnesses:
S. NELSON WHITE,
SAMUEL LEA.